(12) United States Patent
Takeda

(10) Patent No.: US 12,397,429 B2
(45) Date of Patent: Aug. 26, 2025

(54) PROGRAM EVALUATION DEVICE AND TEACHING DEVICE

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 182 days.

(21) Appl. No.: 18/256,717

(22) PCT Filed: Jan. 26, 2022

(86) PCT No.: PCT/JP2022/002749
§ 371 (c)(1),
(2) Date: Jun. 9, 2023

(87) PCT Pub. No.: WO2022/163669
PCT Pub. Date: Aug. 4, 2022

(65) Prior Publication Data
US 2024/0042611 A1    Feb. 8, 2024

(30) Foreign Application Priority Data
Jan. 29, 2021   (JP) ................. 2021-013046

(51) Int. Cl.
*B25J 13/08*    (2006.01)
*B25J 9/00*     (2006.01)
*B25J 9/16*     (2006.01)
*B25J 11/00*    (2006.01)

(52) U.S. Cl.
CPC .......... *B25J 9/1674* (2013.01); *B25J 9/0081* (2013.01); *B25J 9/1605* (2013.01); *B25J 11/005* (2013.01); *B25J 13/089* (2013.01)

(58) Field of Classification Search
CPC ...... B25J 9/1674; B25J 9/1605; B25J 9/0081; B25J 11/005; B25J 13/089; G05B 2219/37256; G05B 2219/45104
See application file for complete search history.

(56) References Cited

U.S. PATENT DOCUMENTS

| 2007/0276538 A1* | 11/2007 | Kjellsson | ............. | B25J 19/0025 901/14 |
| 2009/0069936 A1* | 3/2009 | Kock | ................... | B23K 11/318 901/42 |

(Continued)

FOREIGN PATENT DOCUMENTS

| CN | 106475854 A | 3/2017 |
| JP | H05108123 A | 4/1993 |

(Continued)

*Primary Examiner* — Dalena Tran
(74) *Attorney, Agent, or Firm* — Maier & Maier, PLLC

(57) ABSTRACT

A program evaluation device for evaluating an operation program for a robot. The operation program is a program that causes the robot to perform processing of a workpiece using a tool, and the robot has a function of correcting a position of the tool in response to an amount of wear of the tool. The program evaluation device includes an operation verification unit that verifies whether the robot will operate correctly in accordance with the operation program with each of a plurality of amounts of wear within a predetermined range.

7 Claims, 8 Drawing Sheets

(56) References Cited

U.S. PATENT DOCUMENTS

| | | | |
|---|---|---|---|
| 2016/0184905 A1* | 6/2016 | Tanaka | B23C 3/002 409/303 |
| 2017/0072490 A1 | 3/2017 | Hamada | |
| 2020/0122336 A1* | 4/2020 | Matsuo | B25J 11/0055 |

FOREIGN PATENT DOCUMENTS

| | | |
|---|---|---|
| JP | H08294820 A | 11/1996 |
| JP | H08328632 A | 12/1996 |
| JP | 2000176649 A | 6/2000 |
| JP | 2002273675 A | 9/2002 |
| JP | 2002283059 A | 10/2002 |
| JP | 2005122428 A | 5/2005 |
| JP | 2005125427 A | 5/2005 |
| JP | 2009160636 A | 7/2009 |
| JP | 2016101644 A | 6/2016 |
| WO | 2015132936 A1 | 9/2015 |

* cited by examiner

PROGRAM EVALUATION DEVICE AND TEACHING DEVICE

TECHNICAL FIELD

The present invention relates to a program evaluation device and a teaching device.

BACKGROUND

A robot that performs a predetermined operation, such as welding or processing, on a workpiece has a function for correcting the position of a tool by correcting the position of the robot (for example, see Japanese Patent Application, Publication No. 2005-125427 and Japanese Patent Application, Publication No. H8-328632). For example, an electrode tip of a spot welding gun wears out as welding is repeated, and the position of the tip of the electrode tip is displaced by the amount of wear. Japanese Patent Application, Publication No. 2005-125427 describes that the amount of wear is measured, and the positions of the robot and the spot welding gun are corrected according to the amount of wear.

SUMMARY

An aspect of the present disclosure is a program evaluation device for evaluating an operation program for a robot, the operation program being a program that causes the robot to perform processing of a workpiece using a tool, the robot having a function of correcting a position of the tool in response to an amount of wear of the tool, the program evaluation device including: an operation verification unit that verifies whether the robot will operate correctly in accordance with the operation program with each of a plurality of amounts of wear within a predetermined range.

DETAILED DESCRIPTION OF EMBODIMENTS

When the position of a robot is changed as a result of correction, there is a case where the robot does not operate correctly. For example, when the corrected position is outside the operating range of the robot, an error occurs and the robot stops. When the corrected position is a singular point of the robot, it becomes impossible to control the motion of the robot.

Hereinbelow, a program evaluation device and a teaching device according to an embodiment will be described with reference to the drawings.

A teaching device 1 according to this embodiment is a device that creates, evaluates, and corrects an operation program for a robot 10 offline.

Figure 1:
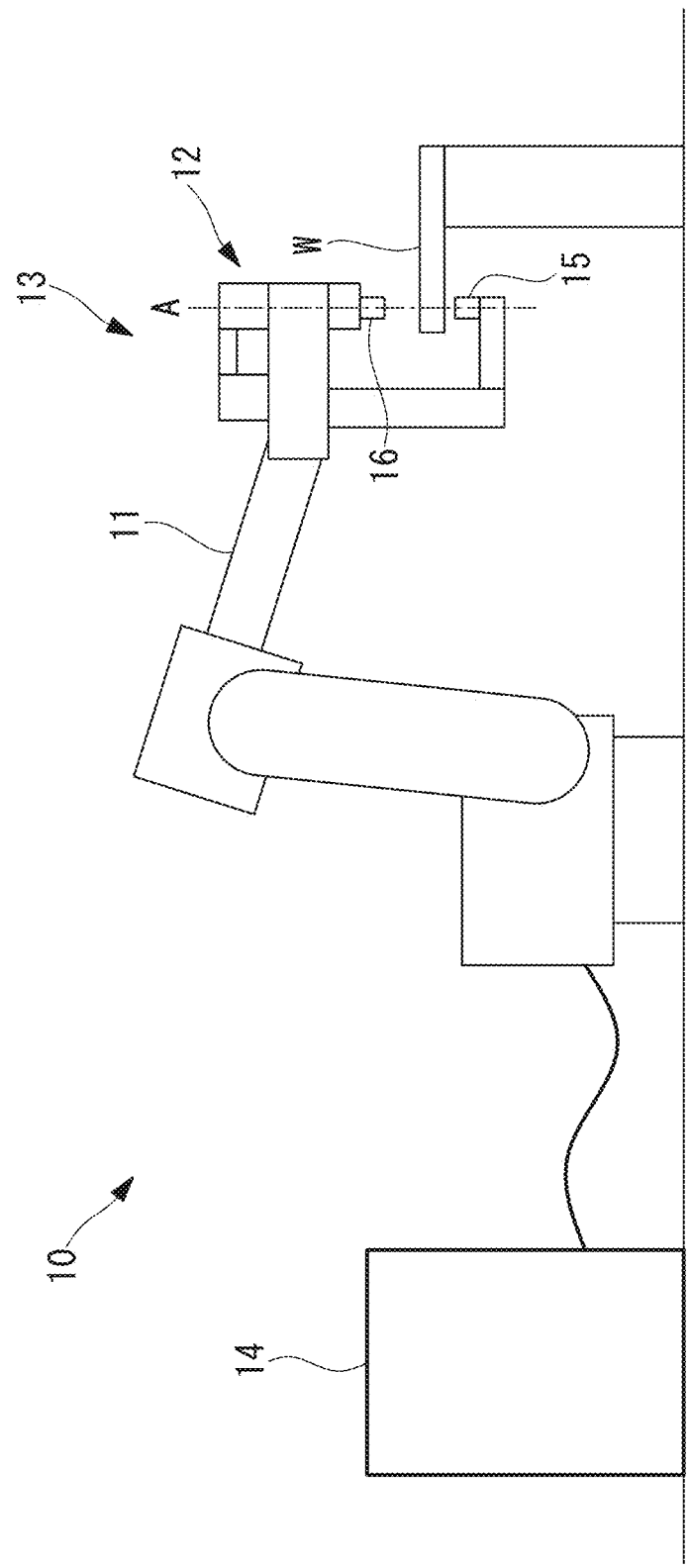
FIG. 1 shows a configuration of an example of a robot.

As shown in FIG. 1, the robot 10 includes a robot main body 13 having an articulated robot arm 11 and a tool 12, and a control device 14 for controlling the robot main body 13. The teaching device 1 creates an operation program for causing the robot 10 to perform processing of a workpiece W using the tool 12. The robot main body 13 shown in FIG. 1 is a six-axis vertical articulated robot. The robot main body 13 may be any other industrial robot generally used for processing a workpiece W.

The tool 12 is a spot welding gun, in which an electric current flows between two electrode tips 15, 16 facing each other, and is attached to the distal end of the robot arm 11. One electrode tip 15 is a fixed-side electrode tip fixed to the distal end of the robot arm 11. The other electrode tip 16 is a movable-side electrode tip that is movable relative to the fixed-side electrode tip 15 along the central axis A of the electrode tips 15, 16. By moving the movable-side electrode tip 16, it is possible to grip a workpiece W between the electrode tips 15, 16.

The fixed-side electrode tip 15 wears and becomes gradually shorter as welding is repeated. The operation program is designed such that the tip of the fixed-side electrode tip 15 is disposed at a welding point (processing point) P when the fixed-side electrode tip 15 has a predetermined length and the amount of wear thereof is zero. The welding point P is a position on a workpiece W at which welding is performed by the electrode tips 15, 16. The robot 10 has an automatic correction function for correcting the position of the tool 12 at the welding point P according to the amount of wear of the fixed-side electrode tip 15 to arrange the tip of the fixed-side electrode tip 15 at the welding point P on the workpiece W regardless of the wear of the fixed-side electrode tip 15. As a result of correcting the position of the tool 12, the position and the posture of the robot arm 11 are also corrected. Hence, the position and the posture of the robot arm 11 at the welding point P differ depending on the amount of wear.

For example, an operator inputs the amount of wear to the control device 14, so that the amount of wear is set in the control device 14. The control device 14 corrects the position of the tool 12 at the welding point P by the amount equal to the set amount of wear, in the direction opposite to the direction of wear. In the case of the example in FIG. 1, because the direction of wear of the fixed-side electrode tip 15 is the downward direction, the control device 14 corrects the position of the tool 12 in the upward direction. As a result, it is possible to cause the tip of the fixed-side electrode tip 15 shortened by wear to come into contact with the workpiece W at the welding point P, so that the workpiece W is reliably welded.

Figure 2:
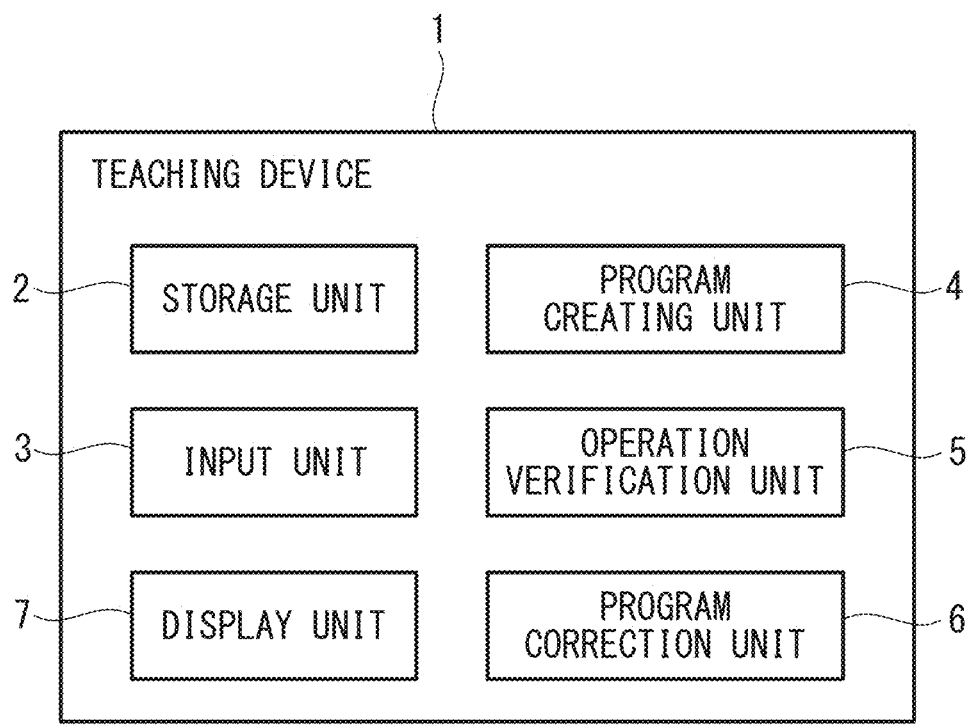
FIG. 2 is a block diagram showing functions of a teaching device according to an embodiment.

As shown in FIG. 2, the teaching device 1 includes a storage unit 2 that stores data necessary for creating an operation program, an input unit 3 through which data is input to the teaching device 1, a program creating unit 4 that creates the operation program, an operation verification unit 5 that verifies the operation of the robot 10 based on the operation program, a program correction unit 6 that corrects the operation program when a problem has been confirmed in the operation of the robot 10, and a display unit 7. The program evaluation device is realized as a part of the teaching device 1 and includes at least the operation verification unit 5 and the program correction unit 6.

The storage unit 2 is a non-volatile recording medium, such as a ROM (read-only memory) or a hard disk drive. The teaching device 1 includes at least one processor, such as a central processing unit, and a memory. The storage unit 2 stores a program for causing the processor to execute the processing described below. The functions of the program creating unit 4, the operation verification unit 5, and the program correction unit 6, which will be described below, are realized as a result of the program being read into the memory and executed by the processor.

The input unit 3 includes at least one input device, such as a keyboard, a mouse, or a touch panel. An operator can input data necessary for creating the operation program to the teaching device 1 using the input unit 3.

The storage unit 2 stores data of a three-dimensional virtual space and data of three-dimensional models of the robot 10, the workpiece W, and peripheral objects disposed around the robot 10. These data are, for example, CAD data.

The storage unit 2 stores teaching data input to the teaching device 1 by the operator using the input unit 3. The teaching data includes the teaching position of one or more teaching points including the welding point P, and the teaching posture and the teaching angle of the tool 12 at the welding point P.

The teaching posture is the posture of the tool 12 about a predetermined axis passing through the welding point P and parallel to the direction of wear, and is the posture about the central axis A in this embodiment. The teaching angle of the tool 12 is the inclination angle of the tool 12 with respect to a predetermined direction, and is the inclination angle of the central axis A with respect to the vertical direction in this embodiment.

The program creating unit 4 creates, offline, an operation program for causing the robot 10 to perform spot welding of a workpiece W in accordance with the teaching data stored in the storage unit 2.

Specifically, the program creating unit 4 reads the data of the virtual space and the data of the three-dimensional models of the robot 10, the workpiece W, and the peripheral objects from the storage unit 2, and arranges the models of the robot 10, the workpiece W, and the peripheral objects in the virtual space. The virtual space in which the models are arranged may be displayed on the display unit 7, such as a liquid crystal display. Next, the program creating unit 4 sets an operation path sequentially passing through one or more teaching points in the virtual space and creates an operation program for moving the tool 12 along the operation path.

The created operation program is at least temporarily stored in the storage unit 2. The operation program includes, as parameters related to the position of the tool 12 at the welding point P, the teaching position of the welding point P (i.e., the tip of the fixed-side electrode tip 15) and the teaching posture and the teaching angle of the tool 12 at the welding point P.

The operation verification unit 5 verifies, offline, whether the robot 10 will operate correctly in accordance with the operation program by simulating the operation of the robot 10 based on the operation program created by the program creating unit 4. At this time, the operation verification unit 5 changes the amount of wear step by step to verify the operation of the robot 10 for verifying each of the plurality of amounts of wear within a predetermined range. The predetermined range and the plurality of amounts of wear are determined by the operator depending on the worn length by which the fixed-side electrode tip 15 has worn and are input and set to the teaching device 1 by the operator using the input unit 3.

Specifically, similarly to the program creating unit 4, the operation verification unit 5 arranges the three-dimensional models of the robot 10, the workpiece W, and the peripheral objects in the three-dimensional virtual space. Next, the operation verification unit 5 corrects the position of the tool 12 at the welding point P according to the amount of wear in a manner similar to or the same as an automatic correction function of the actual robot 10, and corrects the position and the posture of the robot arm 11 accordingly. Next, the operation verification unit 5 causes the model of the robot 10 to operate in the virtual space in accordance with the operation program to verify whether the robot main body 13 operates correctly with the corrected position and posture.

When a predetermined problem occurs during the operation of the robot 10, the operation verification unit 5 determines that the robot 10 will not operate correctly. In contrast, when the predetermined problem does not occur during the operation of the robot 10, the operation verification unit 5 determines that the robot 10 will operate correctly. The predetermined problem includes a situation in which the corrected position of at least one of the tool 12 and the robot arm 11 is located outside a predetermined operating range of the robot main body 13, a situation in which the robot arm 11 is disposed in a singular posture, and a situation in which the robot main body 13 interferes with a peripheral object.

When it is determined that the robot 10 will operate correctly with every amount of wear, the operation verification unit 5 completes the operation verification.

In contrast, when a problem occurs with at least one amount of wear and it is determined that the robot 10 will not operate correctly, the operation verification unit 5 verifies, after the operation program is corrected by the program correction unit 6, whether the robot 10 will operate correctly in accordance with the corrected operation program. The correction of the operation program and the operation verification are repeated until it is determined that the robot 10 will operate correctly with every amount of wear.

Figure 3:
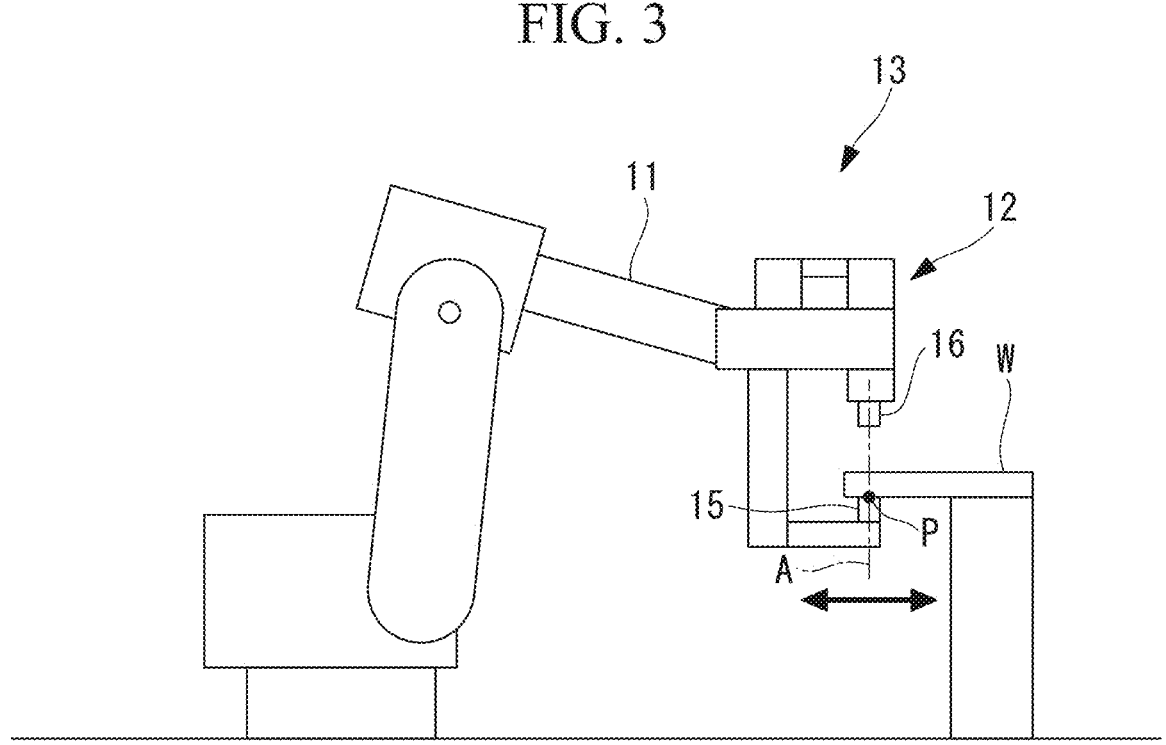
FIG. 3 is a diagram for explaining a parameter correction method.
Figure 4:
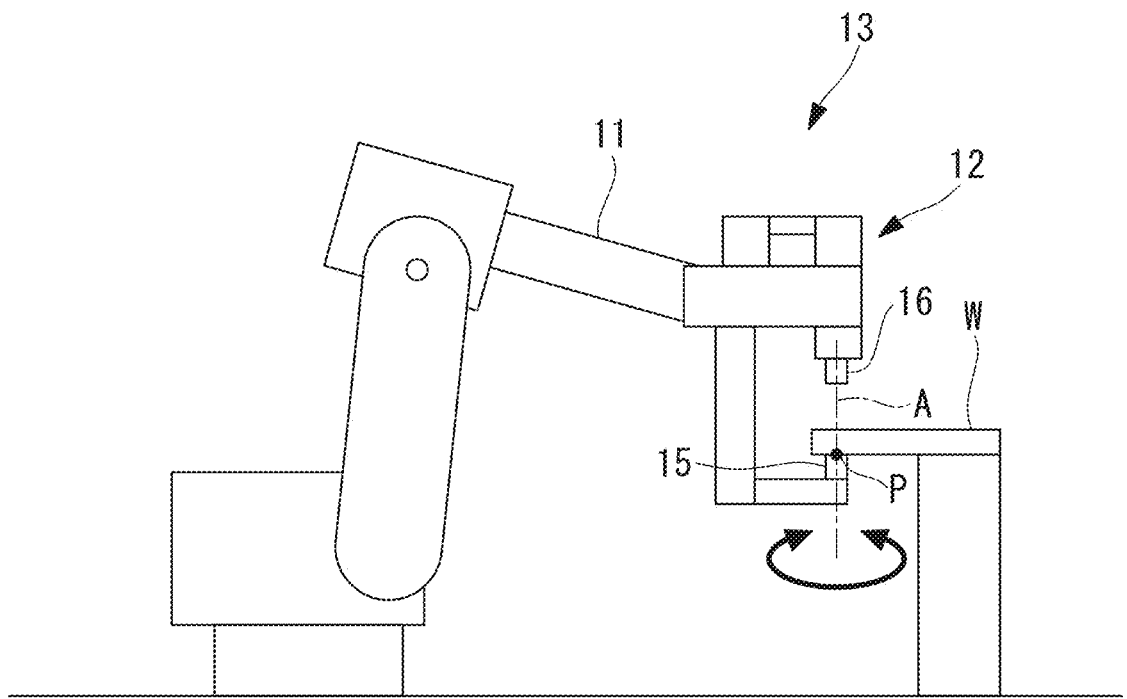
FIG. 4 is a diagram for explaining another parameter correction method.
Figure 5:
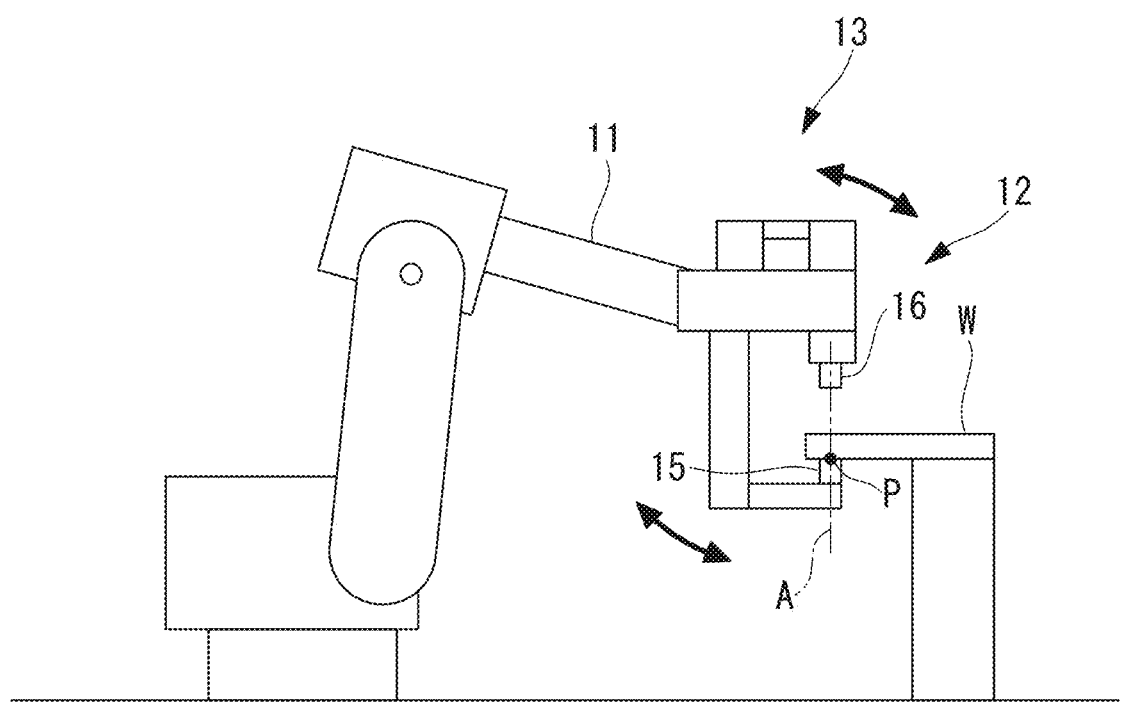
FIG. 5 is a diagram for explaining another parameter correction method.

When it is determined by the operation verification unit 5 that the robot 10 will not operate correctly, as shown in FIGS. 3 to 5, the program correction unit 6 corrects at least one parameter related to the position of the tool 12 at the welding point P so as to solve the problem with the amount of wear with which the problem occurs. As described above, the parameters are the teaching position of the welding point P and the teaching posture and the teaching angle of the tool 12 at the welding point P. It is also possible that the operator can designate the adjustable ranges of the teaching position, the teaching posture, and the teaching angle. Furthermore, it is also possible that the operator can designate the correction amounts and the correction directions of the teaching position, the teaching posture, and the teaching angle.

FIG. 3 shows the correction of the teaching position of the welding point P. The teaching position of the welding point P is corrected to a nearby position on the surface of the workpiece W, that is, is corrected in a direction intersecting the direction of wear and parallel to the surface of the workpiece W. In the example in FIG. 3, the teaching position is corrected in the horizontal direction. As a result, the position of the tool 12 is corrected in the horizontal direction, and the position and the posture of the robot arm 11 are also corrected.

FIG. 4 shows the correction of the teaching posture of the tool 12. As a result of correcting the teaching posture, the tool 12 rotates about the central axis A of the fixed-side electrode tip 15 while maintaining the position of the tip of the fixed-side electrode tip 15 at the welding point P. As a result, the position and the posture of the robot arm 11 are also corrected.

FIG. 5 shows the correction of the teaching angle of the tool 12. As a result of correcting the teaching angle, the tool 12 is inclined with respect to a predetermined direction while maintaining the position of the tip of the fixed-side electrode tip 15 at the welding point P. In the example in FIG. 5, the teaching angle is corrected in a direction which makes the teaching angle inclined with respect to the vertical direction. As a result, the position and the posture of the robot arm 11 are also corrected.

Figure 6:
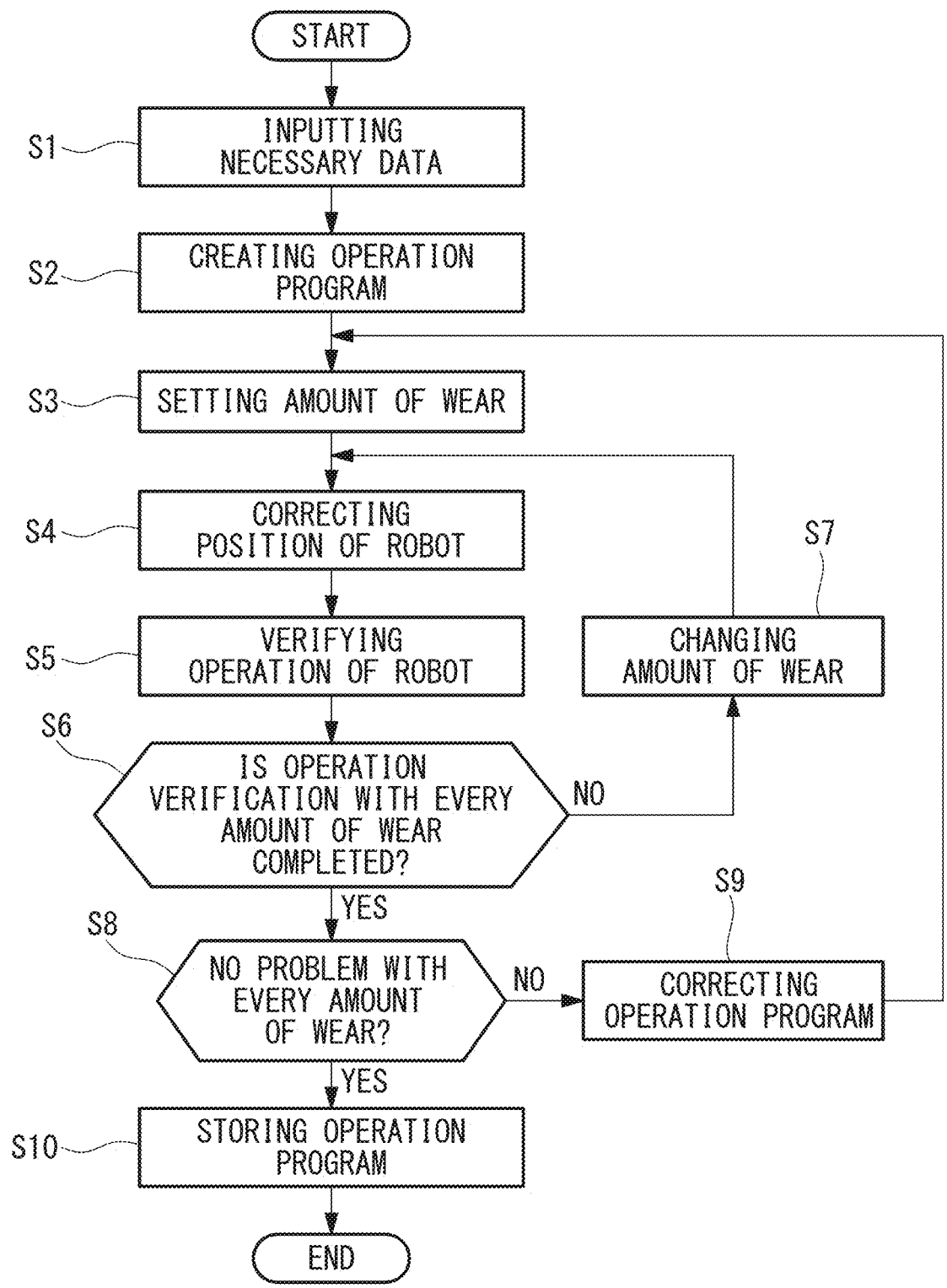
FIG. 6 is a flowchart of processing performed by the teaching device.

Next, the operations of the program evaluation device and the teaching device 1 will be described with reference to FIG. 6.

After an operator inputs data necessary for creating the operation program to the teaching device 1 using the input unit 3 (step S1), creation of the operation program by the teaching device 1 is started. The input data includes the teaching data, the range of the amount of wear, and the amount of wear.

First, the program creating unit 4 creates an operation program for causing the robot 10 to perform spot welding (step S2).

Next, the operation verification unit 5 performs, by simulation, operation verification of the robot 10 with each of a plurality values of amounts of wear within a predetermined range to evaluate the operation program (steps S3 to S7). Specifically, the amount of wear is set (step S3), the position of the tool 12 and the position and the posture of the robot arm 11 at the weld point P are corrected according to the amount of wear (step S4), and the model of the robot main body 13 is operated in the virtual space in accordance with the operation program (step S5). After the operation verification with one specific amount of wear is completed, the amount of wear is changed (step S7), and steps S4 and S5 are performed again.

For example, in the first operation verification, the amount of wear is zero, and the amounts of correction of the tool 12 and the robot arm 11 are also zero. In the second and subsequent operation verification, the amount of wear is a value other than zero, and the position of the tool 12 and the position and the posture of the robot arm 11 are corrected such that the tool 12 is displaced upward by an amount equal to the amount of wear.

After the operation verification with every amount of wear is completed (YES in step S6), when the predetermined problem does not occur in the operation verification with every amount of wear (YES in step S8), the creation of the operation program is completed, and the created operation program is stored in the storage unit 2 (step S10).

In contrast, when the predetermined problem occurs in the operation verification with at least one amount of wear (NO in step S8), the program correction unit 6 corrects a parameter related to the position of the tool 12 at the weld point P in the operation program (step S9). Subsequently, the operation verification is performed again with every amount of wear using the corrected operation program (steps S3 to S8).

Figure 7:
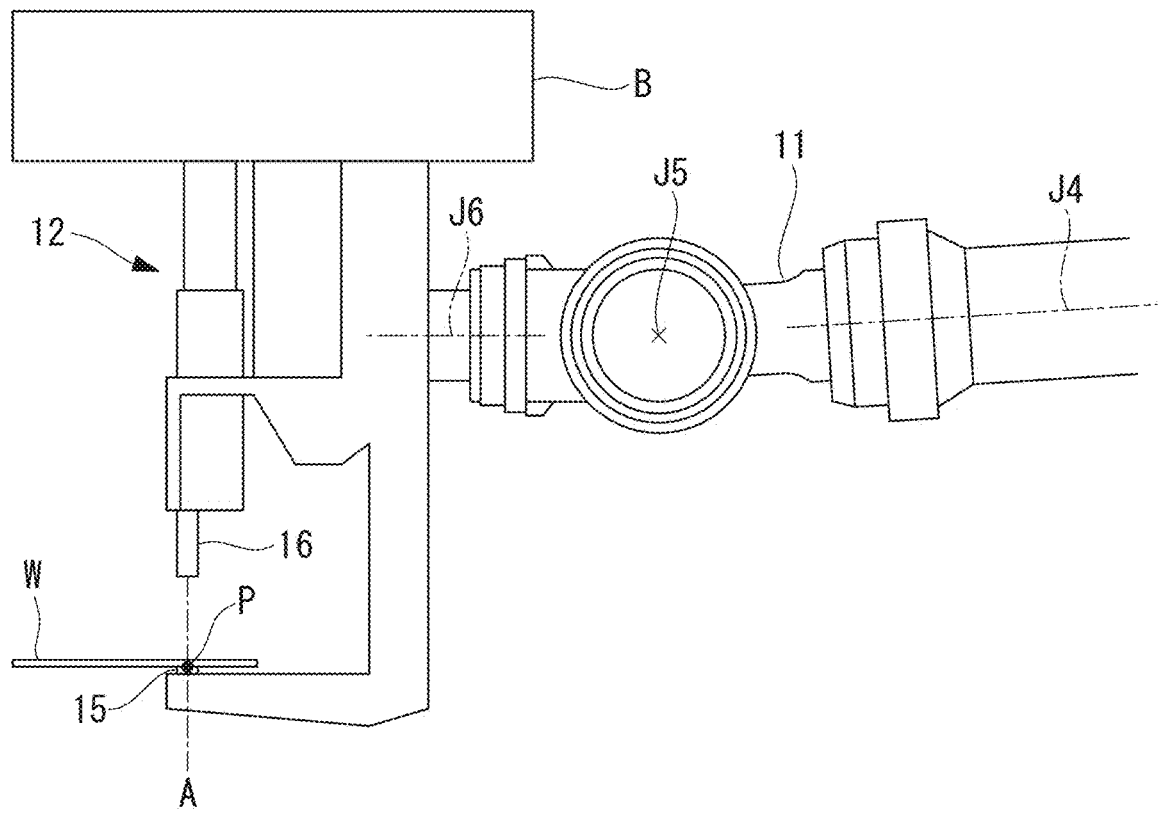
FIG. 7 shows a configuration of a part of the robot showing a state in which the position of a tool is corrected according to the amount of wear.
Figure 8:
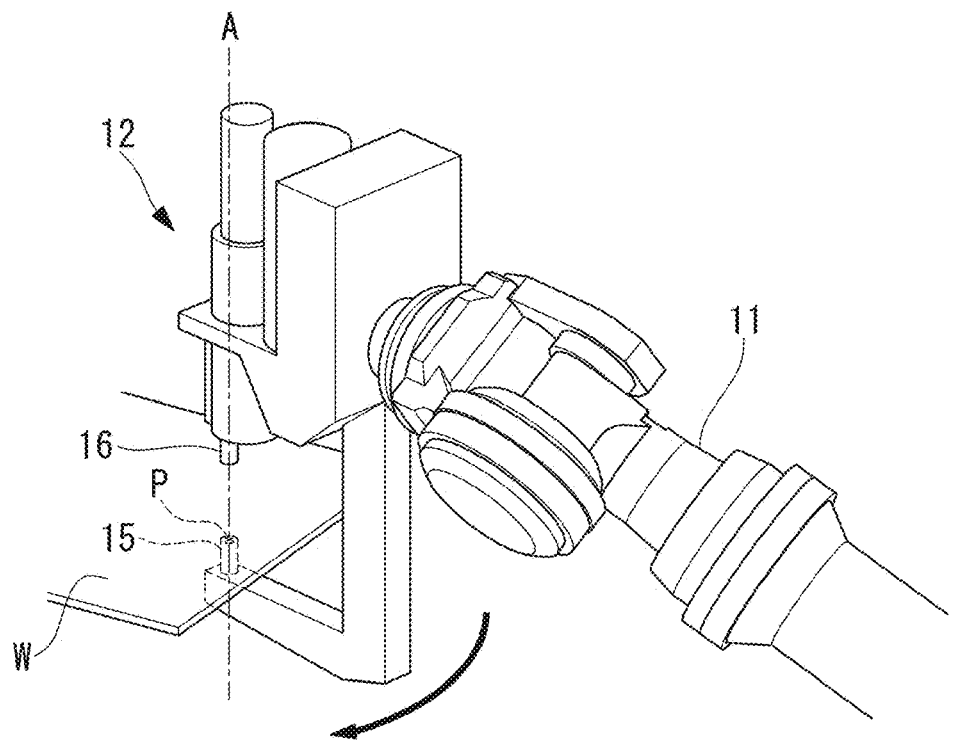
FIG. 8 shows a configuration of a part of the robot showing a state in which the posture of the tool is corrected.
Figure 9:
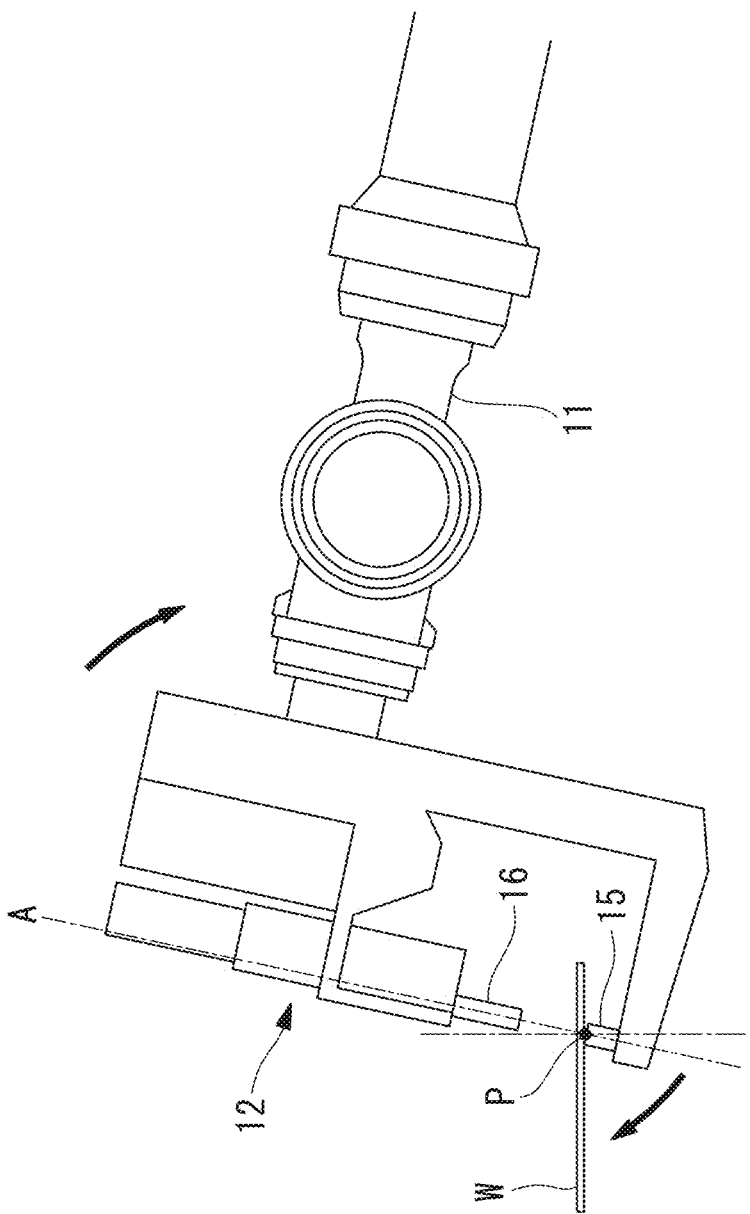
FIG. 9 shows a configuration of a part of the robot showing a state in which the angle of the tool is corrected.

FIG. 7 shows an example of a problem caused by changing the amount of wear. In FIG. 7, as a result of correcting the position of the tool 12 upward, the tool 12 interferes with a peripheral object B, and the robot arm 11 is disposed in a singular posture in which the fourth axis J4 and the sixth axis J6 are substantially aligned. In this case, for example, as shown in FIG. 8, by correcting the teaching posture of the tool 12, the singular posture of the robot arm 11 is eliminated while the position of the tip of the fixed-side electrode tip 15 is maintained at the welding point P. When the teaching position of the welding point P can be changed to a nearby position, the teaching position may be corrected instead of or in addition to the correction of the teaching posture. Furthermore, as shown in FIG. 9, by correcting the teaching angle of the tool 12, the interference of the tool 12 with the peripheral object B is eliminated while the position of the tip of the fixed-side electrode tip 15 is maintained at the welding point P.

The correction of the operation program in step S9 and the operation verification of the robot 10 in steps S3 to S7 are repeated until no predetermined problem occurs in the operation verification with every amount of wear (YES in step S8).

The program correction unit 6 may store the corrected parameter and the amount of correction thereof in the storage unit 2 so that the operator can confirm later what kind of correction is performed in step S9.

As described above, according to this embodiment, it is verified whether the robot main body 13 whose position and posture have been corrected will operate correctly in accordance with the operation program with each of the plurality amounts of wear within the predetermined range. In this way, it is possible to evaluate in advance whether the operation program can operate the robot 10 without causing any problem with any amount of wear before the actual robot 10 actually processes a workpiece W.

When a problem is confirmed with at least one amount of wear, a parameter related to the position of the tool 12 at the welding point P in the operation program is corrected, and it is verified again whether the robot 10 will operate correctly in accordance with the corrected operation program. The correction of the operation program and the operation verification of the robot 10 are repeated until the robot 10 operates correctly with every amount of wear. As a result, it is possible to create an operation program with which the robot 10 operates correctly with every amount of wear.

The operation program finally created by the teaching device 1 is incorporated into the control device 14 of the actual robot 10. While the control device 14 causes the actual robot main body 13 to repeatedly perform spot welding in accordance with the operation program, the fixed-side electrode tip 15 wears out. The operator inputs to set the amount of wear of the fixed-side electrode tip 15 to the control device 14. The control device 14 corrects the position of the tool 12 at the welding point P in accordance with the set amount of wear, and corrects the position and the posture of the robot arm 11 accordingly. At this time, the robot main body 13 can operate correctly even after the correction of the position of the tool 12, and thus, it is possible to prevent the occurrence of a problem in the operation of the robot main body 13 due to a change in the set value of the amount of wear on site, such as at a factory, where spot welding of a workpiece W is actually performed.

In spot welding, to obtain high welding quality, the teaching angle of the tool 12 at the welding point P is usually set to an angle at which the electrode tips 15 and 16 are disposed perpendicularly to the surface of a workpiece W. Specifically, among the three parameter corrections shown in FIGS. 3, 4 and 5, the correction of the teaching angle may affect the welding quality. Hence, priorities may be set for the three parameters, and the program correction unit 6 may correct the parameters in descending order of priority.

For example, when a problem occurs with an amount of wear, the program correction unit 6 first corrects the teaching posture of the tool 12. When the problem occurs again in the subsequent operation verification, the program correction unit 6 next corrects the position of the welding point P. When the problem occurs again in the subsequent operation verification, the program correction unit 6 next corrects the teaching angle of the tool 12.

In the above-described embodiment, when interference between the robot 10 and a peripheral object occurs in the operation verification, the operation verification unit 5 may store the position and the posture of the robot 10 at the time of the interference in the storage unit 2.

After the creation of the operation program is completed, the operator checks the position where the interference occurred and the posture of the robot main body 13 at that time, and examines whether the interference can be avoided by changing the design of the peripheral object and the robot main body 13. The design change is, for example, a change in the shape and arrangement of each of the peripheral object B and the robot main body 13. When the interference can be avoided by changing the design, the operator changes the design of at least one of the peripheral object and the robot main body 13. In this way, it is possible to use the operation program in which none of the teaching position, the teaching posture, and the teaching angle has been corrected for the operation of the actual robot 10.

In the above-described embodiment, although the teaching device 1 creates the operation program offline, the teaching device 1 may create the operation program online.

For example, the operator inputs teaching data necessary for creating the operation program to the teaching device 1 by means of remote teaching using a portable teaching operation panel or direct teaching in which the operator holds a part of the robot and directly operates the robot. The operation verification unit 5 causes the actual robot 10 to operate in accordance with the operation program created by the program creating unit 4 and verifies online whether the robot 10 operates correctly with each amount of wear. When a problem occurs in the operation verification, the operator may manually correct the operation program. Alternatively, as in the offline case, the program correction unit 6 may automatically correct the operation program.

In the embodiment described above, although the program evaluation device is incorporated in the teaching device 1, instead of this, the program evaluation device may be incorporated in the control device 14 of the robot 10 and realized as a part of the control device 14.

In this case, at least the operation verification unit 5 is incorporated into the control device 14. The operator removes the electrode tips 15 and 16 from the tool 12 as necessary and instructs the control device 14 to perform operation verification.

The operation verification unit 5 causes the actual robot 10 to operate in accordance with the operation program incorporated in the control device 14 and verifies online whether the robot 10 operates correctly with each amount of wear. When a problem occurs in the operation verification, the operator may manually correct the operation program. Alternatively, the program correction unit 6 incorporated into the control device 14 may automatically correct the operation program.

With this configuration, it is possible to confirm that the robot 10 operates correctly with every amount of wear in advance and then cause the robot 10 to perform processing of a workpiece W, even on site, such as at a factory.

Figure 10:
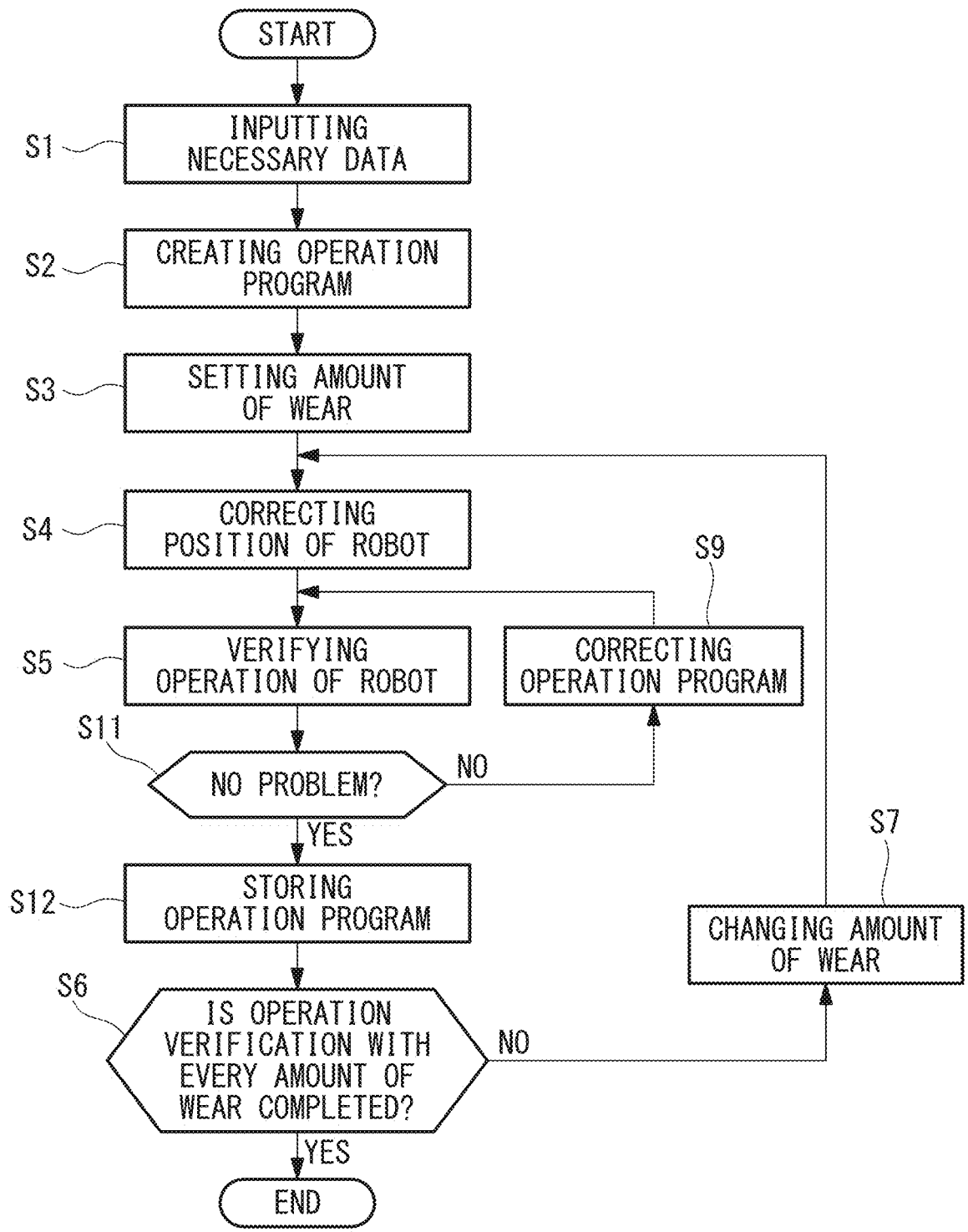
FIG. 10 is a flowchart of a modification of the processing performed by the teaching device.

In the above-described embodiment, to operate the robot main body 13 using the same operation program regardless of the amount of wear, the teaching device 1 creates an operation program with which the robot main body 13 operates correctly with every amount of wear. However, instead of this, as shown in FIG. 10, the teaching device 1 may create operation programs for respective amounts of wear.

Specifically, after operation verification with one amount of wear is completed (steps S4 and S5), when the predetermined problem does not occur in the operation verification with that amount of wear (YES in step S11), the creation of the operation program for one amount of wear is completed, and the created operation program is stored in the storage unit 2 in association with the amount of wear (step S12).

In contrast, when a predetermined problem occurs (NO in step S11), a parameter in the operation program is corrected (step S9), and the operation verification with the same amount of wear is performed again using the corrected operation program (step S5). The operation verification and the correction of the operation program with the same amount of wear are repeated until no problem occurs.

After the creation of the operating program for one amount of wear is completed (step S12), the amount of wear is changed (step S7), and steps S4, S5, S9, S11, and S12 are performed again. Steps S4 to S12 are repeated until the operation verification with every amount of wear is completed and the creation of the operation programs for every amount of wear is completed (YES in step S6). As a result, a plurality of operation programs respectively corresponding to the plurality amounts of wear within a predetermined range are created and stored in the storage unit 2.

In the above-described embodiment, although the program evaluation device is realized as a part of the teaching device 1 or the control device 14, instead of this, it may be realized as a device separate from the teaching device 1 or the control device 14.

For example, the program evaluation device may be connected to the teaching device 1, receive the operation program created by the program creating unit 4 from the teaching device 1, perform, either offline or online, the operation verification of the robot 10 in accordance with the operation program, and correct the operation program as necessary.

In the above embodiment, the amount of wear to be input to the control device 14 may be a negative value. When a fixed-side electrode tip 15 that is longer than a standard fixed-side electrode tip 15 is attached to the tool 12, by inputting a negative value as the amount of wear, it is possible to correct the position of the tool 12 in the same direction as the direction of wear and to arrange the tip of the long fixed-side electrode tip 15 at the welding point P on the workpiece W.

In the above-described embodiment, as a result of correcting the teaching posture and the teaching angle, the operation of the robot main body 13 may change and the cycle time may change. Hence, the system may be configured such that the operator can set the allowable range of the cycle time.

Although the tool 12 is a spot welding gun in the above-described embodiment, the tool 12 is not limited thereto, and may be any tool that wears with use. For example, the tool 12 may be a drill whose tip is worn due to contact with the workpiece W.

The parameter to be corrected is selected according to the type of tool 12. For example, when the tool 12 is a drill, the program correction unit 6 may correct only the teaching posture at the processing point.

Although the case where the tool 12 wears in the longitudinal direction has been described in the above-described embodiment, the program evaluation device is also applicable to the case where the tool 12 wears in the radial direction.

Figure 11A:
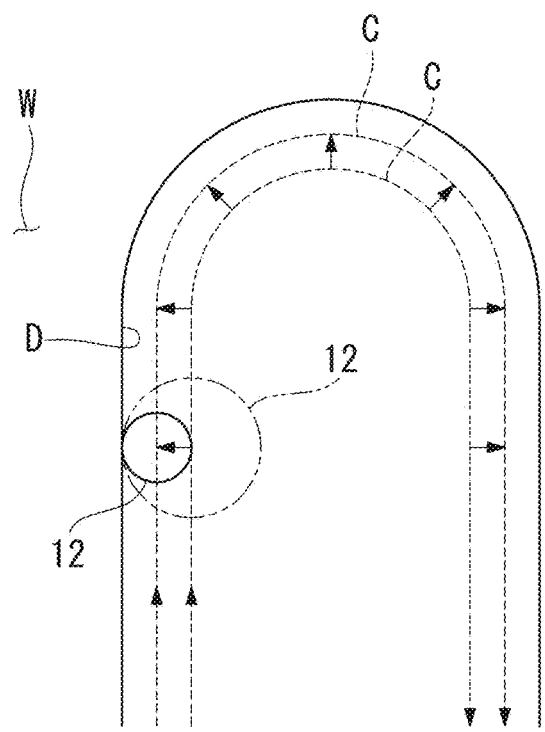
FIG. 11A is a plan view showing correction of the position of a cutting tool in the radial direction.
Figure 11B:
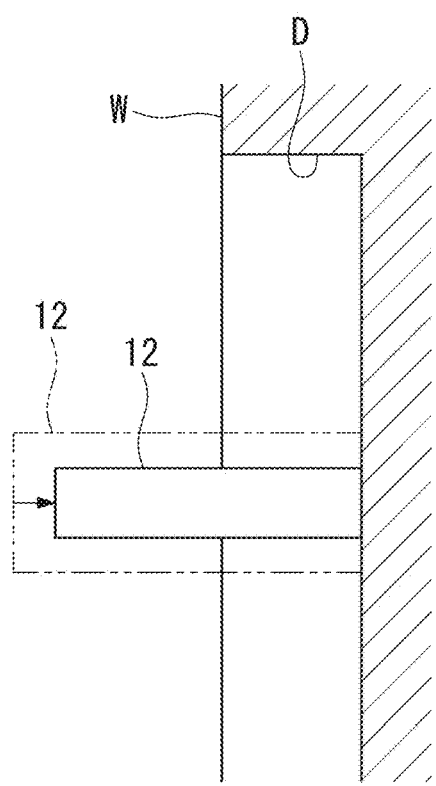
FIG. 11B is a side view showing correction of the position of the cutting tool in the longitudinal direction.

For example, when the tool 12 is a cutting tool, the cutting tool 12 becomes gradually shorter due to wear of the tip in the longitudinal direction and becomes gradually thinner due to wear of the outer circumferential surface in the radial direction. FIGS. 11A and 11B show automatic correction of the position of the cutting tool 12 performed by the robot 10 when the cutting tool 12 is moved along a path C to process a cutting surface D. The cutting tool 12 in a double-dashed chain line is an unworn tool, and the cutting tool 12 in a solid line is a tool that is worn in the longitudinal and radial directions. As shown in FIG. 11A, the position of the cutting tool 12 is corrected in a direction in which the path C widens, that is, in the radial direction toward the cutting surface D, according to the amount of wear in the radial direction to maintain the contour of the cutting surface D regardless of the wear in the radial direction. As shown in FIG. 11B, the position of the cutting tool 12 is corrected forward in the longitudinal direction according to the amount of wear in the longitudinal direction.

As a result of correcting the position of the cutting tool 12 in the radial direction, the position and the posture of the robot arm 11 are also corrected. Hence, a predetermined range and a predetermined amount of wear are set for each of the radial direction and the longitudinal direction, and the operation verification unit 5 verifies whether the robot main body 13 will operate correctly with each combination of the amount of wear in the radial direction and the amount of wear in the longitudinal direction. In this way, it possible to evaluate in advance whether the operation program can operate the robot 10 without causing any problem with any amount of wear not only in the longitudinal direction but also in the radial direction.

The invention claimed is:

1. A program evaluation device for evaluating an operation program for a robot, the operation program being a program that causes the robot to perform processing of a workpiece using a tool, the program evaluation device comprising:
   a storage unit storing a model of the robot in a three-dimensional virtual space and a model of the workpiece in the three-dimensional virtual space; and
   a processor, wherein the processor is configured to conduct:
   a first simulation that causes the model of the robot to operate based on the operation program relative to the model of the workpiece in the three-dimensional virtual space;
   a correction of the operation program in accordance with an amount of wear of the tool;
   a second simulation that causes the model of the robot to operate based on corrected operation program by the correction relative to the model of the workpiece in the three-dimensional virtual space; and
   a verification that verifies whether the model of the robot operates without abnormal operation in the first simulation and the second simulation.

2. The program evaluation device according to claim 1, wherein
   the operation program includes one or more parameters related to positioning of the tool at a processing point at which the workpiece is processed, and
   the processor is configured to correct the parameters when it is confirmed by the verification that the robot operates abnormally with the amount of wear.

3. The program evaluation device according to claim 2, wherein
   the parameters are a position of the processing point and an orientation and an angle of the tool at the processing point, and
   the processor is configured to correct the position of the processing point and at least one of the orientation and the angle of the tool at the processing point.

4. The program evaluation device according to claim 2, wherein
   the operation program includes a plurality of the parameters, and priorities are set for the plurality of parameters, and
   the processor is configured to corrects the parameters in descending order of priority.

5. The program evaluation device according to claim 1, wherein
   the processor determines that the robot does not operate without the abnormal operation when a predetermined problem occurs during operation of the model of the robot with the amount of wear, and
   the predetermined problem includes at least one of a situation in which the model of the robot is located outside an operating range of the robot, a situation in which the model of the robot is disposed in singular posture, and a situation in which the model of the robot interferes with a peripheral object.

6. The program evaluation device according to claim 1, wherein the tool is a spot welding gun, and the amount of wear is an amount of wear of a fixed-side electrode tip of the spot welding gun.

7. A teaching device for teaching an operation of a robot, the teaching device comprising the program evaluation device according to claim 1.

* * * * *